United States Patent
Oota (10) Patent No.: US 8,472,030 B2
(45) Date of Patent: Jun. 25, 2013

(54) SURFACE PROFILE MEASURING APPARATUS, METHOD OF MEASURING SURFACE PROFILE, AND METHOD OF MANUFACTURING OPTICAL ELEMENT

(75) Inventor: Tetsuji Oota, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 391 days.

(21) Appl. No.: 12/964,664

(22) Filed: Dec. 9, 2010

(65) Prior Publication Data

US 2011/0141482 A1    Jun. 16, 2011

(30) Foreign Application Priority Data

Dec. 16, 2009   (JP) ................................. 2009-285770

(51) Int. Cl.
  *G01B 11/02*  (2006.01)
(52) U.S. Cl.
  USPC .......................................... 356/515; 356/513
(58) Field of Classification Search
  USPC ................... 356/489, 495, 511–515
  See application file for complete search history.

(56) References Cited

U.S. PATENT DOCUMENTS

| | | | | |
|---|---|---|---|---|
| 4,653,923 A | * | 3/1987 | Kitabayashi | 356/513 |
| 6,894,788 B2 | * | 5/2005 | Deck | 356/513 |
| 2010/0225926 A1 | * | 9/2010 | van Amstel et al. | 356/511 |

FOREIGN PATENT DOCUMENTS

| | | |
|---|---|---|
| JP | 2000-097663 A | 4/2000 |
| JP | 2002-333305 A | 11/2002 |

\* cited by examiner

*Primary Examiner* — Tarifur Chowdhury
*Assistant Examiner* — Jonathon Cook
(74) *Attorney, Agent, or Firm* — Canon U.S.A., Inc. IP Division (57) ABSTRACT

A surface profile measuring apparatus includes a first image pickup device that obtains an interference pattern, an optical system that guides a measuring beam and a reference beam to the first image pickup device, a second image pickup device with which a distribution of light quantity of a beam from a light source traveling thereto avoiding the optical system is measured, and an arithmetic unit that calculates a profile of a target surface from the interference pattern. A distribution of light quantity of a beam from the light source transmitted through the optical system is measured with the first image pickup device. The profile of the target surface calculated by the arithmetic unit is corrected on the basis of the distributions of light quantity measured with the first and second image pickup devices.

12 Claims, 11 Drawing Sheets

SURFACE PROFILE MEASURING APPARATUS, METHOD OF MEASURING SURFACE PROFILE, AND METHOD OF MANUFACTURING OPTICAL ELEMENT

BACKGROUND OF THE INVENTION

1. Field of the Invention

The present invention relates to a surface profile measuring apparatus, a method of measuring a surface profile, and a method of manufacturing an optical element.

2. Description of the Related Art

Surface profile measuring apparatuses used in measuring the surface profiles of optical elements such as lenses and mirrors are known. In general, a surface profile measuring apparatus measures the profile of a target surface, which is a surface to be measured, by picking up the image of an interference pattern formed by interference between a measuring beam reflected by the target surface and a reference beam reflected by a reference surface. The surface profile measuring apparatus includes an optical system configured to split light from a light source into a measuring beam and a reference beam, an optical system configured to integrate the measuring beam and the reference beam together and to guide the integrated beam to an image pickup device, and so forth. If such optical systems have errors, the measurements obtained by the surface profile measuring apparatus may be inversely affected.

Exemplary errors of the optical systems include distortion. Distortion refers to an error exhibited as in-plane deformity of an image formed on the image pickup surface of an image pickup device. An optical system having distortion forms a deformed interference pattern on the image pickup surface. The distortion further distorts measurements obtained by the surface profile measuring apparatus. Consequently, when the target surface is processed on the basis of the measurements, deviation may occur between the measuring coordinates and the processing coordinates. Theoretically, it is possible to design the optical systems of the surface profile measuring apparatus without distortions. To do so, however, stringent design restrictions are imposed. Such restrictions, for example, increase the number of lenses included in the optical systems, and make the surface profile measuring apparatus larger and more complicated.

Japanese Patent Applications Laid-Open No. 2000-97663 (JP 2000-97663) and No. 2002-333305 (JP 2002-333305) propose to address the above-discussed issues and disclose surface profile measuring apparatuses capable of obtaining precise measurements even if optical systems thereof have distortions. In the apparatuses disclosed by JP 2000-97663 and JP 2002-333305, the distortions of the optical systems are calculated in advance, and measurements obtained by the apparatuses are corrected on the basis of the calculated distortions, whereby precise measurements are purportedly obtained. Specifically, in the apparatus disclosed by JP 2000-97663, the distortion is calculated by performing alignment of the target surface with some deviation while the interference pattern is being measured. In the apparatus disclosed by JP 2002-333305, the distortion is calculated by measuring a primary standard as a target object in advance.

In the apparatus disclosed by JP 2000-97663, however, if the amount of driving performed for deviating the alignment of the target surface includes an error, it is difficult to separate the change in the interference pattern due to the deviation in the alignment and the change in the interference pattern due to the distortion. The amount of driving performed for deviating the alignment needs to be controlled in nanometer order, and it is therefore difficult to control the amount of driving without errors. Accordingly, with the apparatus disclosed by JP 2000-97663, it is difficult to precisely calculate the distortion.

In the apparatus disclosed by JP 2002-333305, every time the desired profile of the target surface is changed, the primary standard needs to be replaced with another one whose surface profile is the same as that of the target surface. Furthermore, a mark to be provided on the primary standard needs to be formed on the basis of in-plane coordinates whose precision is not guaranteed. Accordingly, from the foregoing, it is evident that it is not easy to calculate the distortion.

SUMMARY OF THE INVENTION

The present invention provides a surface profile measuring apparatus capable of precise and easy calculation of distortion and precise measurement of a surface profile.

According to one aspect of the present invention, a surface profile measuring apparatus is provided in which light from a light source is split into a measuring beam and a reference beam and a profile of a target surface is measured on the basis of an interference pattern formed by interference between the measuring beam reflected by the target surface and the reference beam. The apparatus includes a first image pickup device configured to pick up an image of the interference pattern, an optical system configured to guide the measuring beam and the reference beam to the first image pickup device, a second image pickup device with which a distribution of light quantity (light intensity distribution) of a beam of the light from the light source traveling thereto avoiding the optical system is measured, and an arithmetic unit configured to calculate a profile of the target surface on the basis of the image of the interference pattern picked up by the first image pickup device. A distribution of light quantity of a beam of the light from the light source transmitted through the optical system is measured with the first image pickup device. The profile of the target surface calculated by the arithmetic unit is corrected on the basis of the distribution of light quantity measured with the first image pickup device and the distribution of light quantity measured with the second image pickup device.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described in detail in accordance with the accompanying drawings.

Like elements are denoted by like reference numerals in the drawings, and redundant descriptions are omitted.

First Embodiment

Figure 1A:
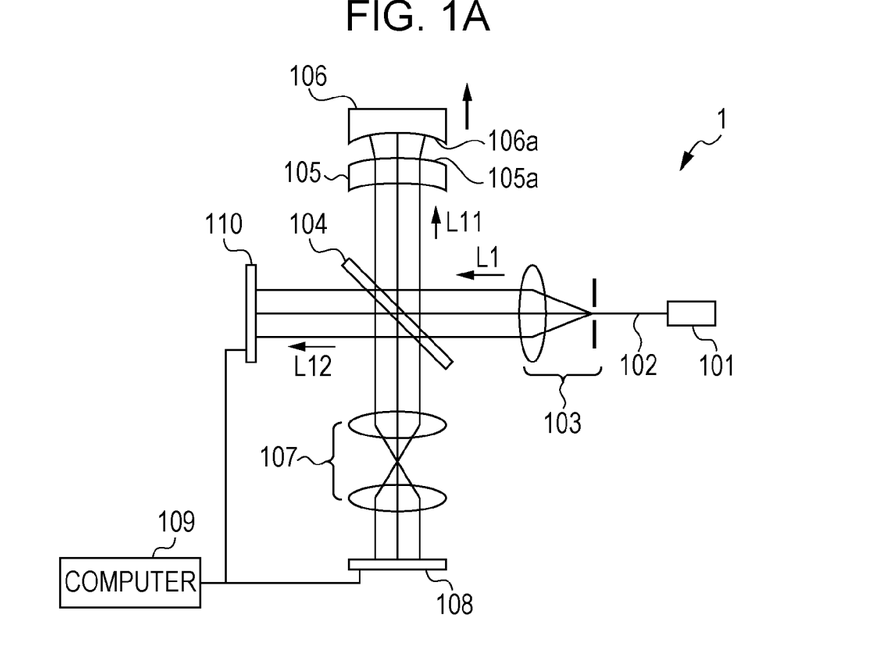
FIGS. 1A and 1B show the configuration of a surface profile measuring apparatus according to a first embodiment of the present invention.

FIG. 1A shows a surface profile measuring apparatus 1 according to a first embodiment of the present invention. The surface profile measuring apparatus 1 according to the first embodiment is a Fizeau interferometer and measures the profile of a target surface 106a of an object 106. The surface profile measuring apparatus 1 includes a light source 101, a fiber 102, a beam expander 103, a beam splitter 104, a Fizeau lens 105, an afocal lens 107, a first image pickup device 108, a second image pickup device 110, and a computer (arithmetic unit or calculating unit) 109.

Light emitted from the light source 101 is guided by the fiber 102 to the beam expander 103, and is shaped by the beam expander 103 into a beam L1 having a specific diameter. The beam L1 is split into a beam L11 that is reflected by the beam splitter 104 and a beam L12 that is transmitted through the beam splitter 104. The beam splitter 104 is an optical element that splits a beam incident thereon into a plurality of beams.

The beam L11 enters the Fizeau lens 105, and is split into a reference beam that is reflected by a Fizeau surface 105a and a measuring beam that is transmitted through the Fizeau surface 105a. The Fizeau surface 105a of the Fizeau lens 105 is a reference surface and has a function of splitting a beam incident thereon into the measuring beam and the reference beam and a function of integrating the measuring beam incident thereon and the reference beam together. The measuring beam transmitted through the Fizeau surface 105a is reflected by the target surface 106a and is incident on the Fizeau surface 105a again. The measuring beam that has been incident on the Fizeau surface 105a again is integrated with the reference beam.

The beam resulting from the integration of the measuring beam and the reference beam is transmitted through the beam splitter 104, is guided by the afocal lens 107 to the image pickup device 108, and forms a pattern of interference fringes (hereinafter also referred to as an interference pattern) on the image pickup device 108. The pattern of the interference fringes reflects the difference in optical-path length between the measuring beam and the reference beam, i.e., the gap between the Fizeau surface 105a and the target surface 106a. When the difference in optical-path length is an even-number multiple of the half wavelength of the beam, a light-colored fringe is formed on the image pickup device 108. When the difference in optical-path length is an odd-number multiple of the half wavelength of the beam, a dark-colored fringe is formed on the image pickup device 108. If the Fizeau surface 105a has a guaranteed profile, the profile of the target surface 106a can be calculated on the basis of an image of the interference pattern picked up by the image pickup device 108. The profile of the target surface 106a is calculated by the computer 109.

Figure 1B:
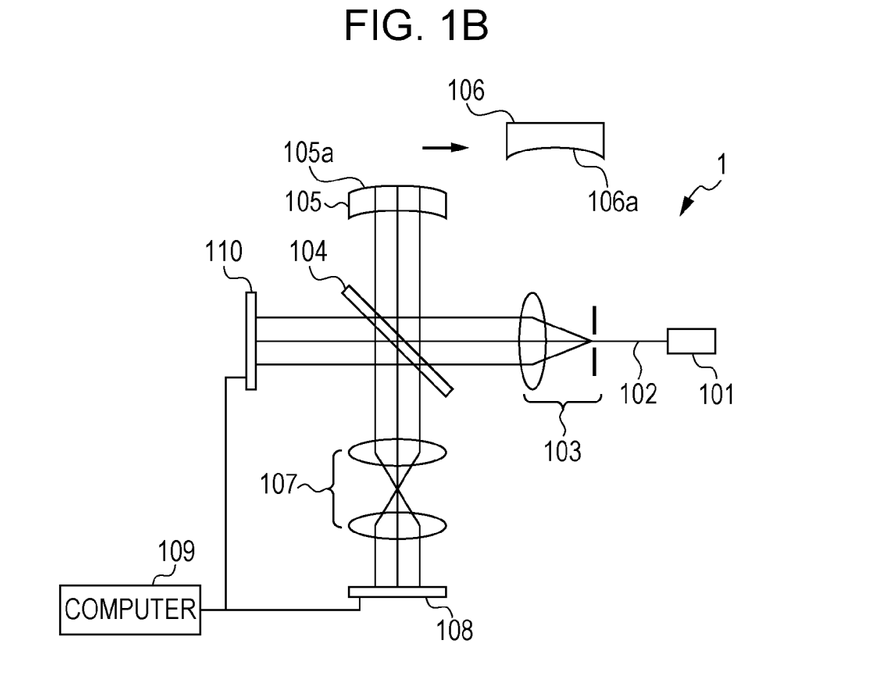

In the surface profile measuring apparatus 1 according to the first embodiment, not only the interference pattern but also the distribution of light quantity in a case where the measuring beam and the reference beam do not interfere with each other or the distribution of light quantity of the reference beam alone is measured with the image pickup device 108. The distribution of light quantity in the case where the measuring beam and the reference beam do not interfere with each other can be measured with the image pickup device 108 by moving the object 106 away from the Fizeau lens 105 in the direction of the arrow shown in FIG. 1A such that the difference in optical-path length between the measuring beam and the reference beam becomes larger than the coherent length of the beam. Alternatively, the distribution of light quantity in the case where the measuring beam and the reference beam do not interfere with each other may be measured by moving the object 106 in the direction of the arrow shown in FIG. 1A while the image of the interference pattern is picked up by the image pickup device 108 and then by calculating the maximum light quantities or the amplitude of variations in light quantity on individual pixels. The light quantities on the individual pixels may be added up. Furthermore, as shown in FIG. 1B, if the object 106 is moved to the outside of the optical path, the distribution of light quantity of the reference beam alone can be measured with the image pickup device 108. Meanwhile, the beam L12 transmitted through the beam splitter 104 is incident on the image pickup device 110. The image pickup device 110 is used for measurement of the distribution of light quantity of the beam L12.

Here, in the case where the distribution of light quantity of the reference beam alone is measured with the image pickup device 108 (the case shown in FIG. 1B), the distribution of light quantity measured with the image pickup device 108 and the distribution of light quantity measured with the image pickup device 110 are compared. The reference beam is incident on the image pickup device 108 through optical systems including the Fizeau lens 105 and the afocal lens 107, whereas the beam L12 is incident on the image pickup device 110 without traveling through the foregoing optical systems. Therefore, there is a difference between the distributions of light quantity measured with the image pickup devices 108 and 110.

When the distributions of light quantity of the beam L1 entering the beam splitter 104, the beam L11 reflected by the beam splitter 104, and the beam L12 transmitted through the beam splitter 104 are denoted by P(L1), P(L11), and P(L12), respectively, the following relationship holds:

$$P(L1)=P(L11)+P(L12)=P(L1)\cdot rr+P(L1)\cdot rt \quad (1)$$

That is, P(L1) is divided into P(L11) and P(L12) in accordance with the ratios of the reflectance rr and the transmittance rt at the beam splitter 104. The reflectance rr and the transmittance rt can be measured in advance by causing a beam to enter the beam splitter 104. The shapes of the distributions of light quantity of P(L11) and P(L12) are similar to each other.

A distribution of light quantity P(ref.) of the reference beam from the Fizeau surface 105a can be measured with the image pickup device 108. Since P(ref.) is affected by the Fizeau lens 105 and the afocal lens 107, P(ref.) is expressed as a linear sum of components given below:

$$P(ref.)=P(L11)\cdot r1-P(Ef)-P(Eh) \quad (2)$$

where P(Ef) denotes the amount by which the distribution of light quantity is reduced in accordance with the shapes of the Fizeau lens 105 and lens elements included in the afocal lens 107 (for example, the distribution of lens thickness and the distribution of air between lenses); P(Eh) denotes the amount by which the distribution of light quantity is reduced in accordance with the inhomogeneities of the materials of the Fizeau lens 105 and the lens elements included in the afocal lens 107; and r1 denotes the reflectance of P(L11) on the Fizeau surface 105*a*. In Expression (2), the amounts of reduction may be each expressed as a function that changes with the light quantity of the incident beam. The reflectance r1 ranges from 1 to 10%, provided that the Fizeau lens 105 is made of common optical glass. The reflectance r1 in Expression (2) may be expressed as a function that changes with the position so that a distribution thereof on the Fizeau surface 105*a* can be obtained.

Expression (2) demonstrates that the relationship between the distribution of light quantity of the beam L11 and the distribution of light quantity of the reference beam is constant. In an ideal surface profile measuring apparatus, the relationship of Expression (2) holds. In an actual surface profile measuring apparatus, however, the relationship of Expression (2) does not hold unless a component P(D) is added on the right side of Expression (2), as given below:

$$P(ref.) = P(L11) \cdot r1 - P(Ef) - P(Eh) + P(D) \quad (3)$$

Figure 2A:
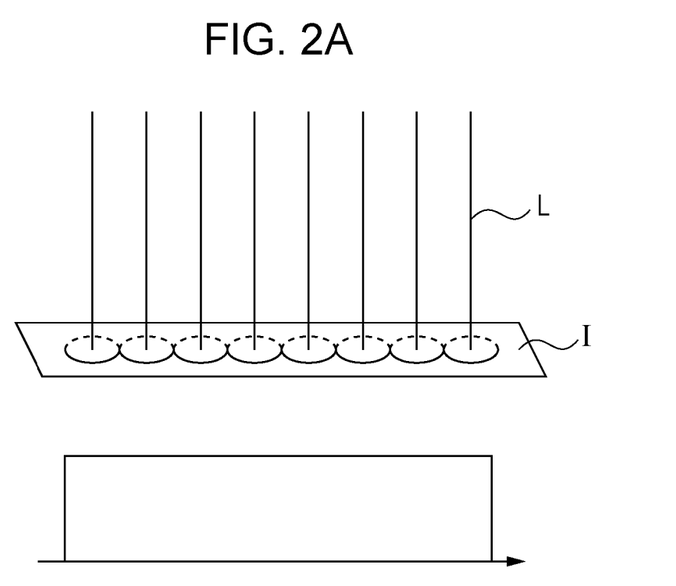
FIGS. 2A and 2B schematically show change in the distribution of light quantity due to distortion.
Figure 2B:
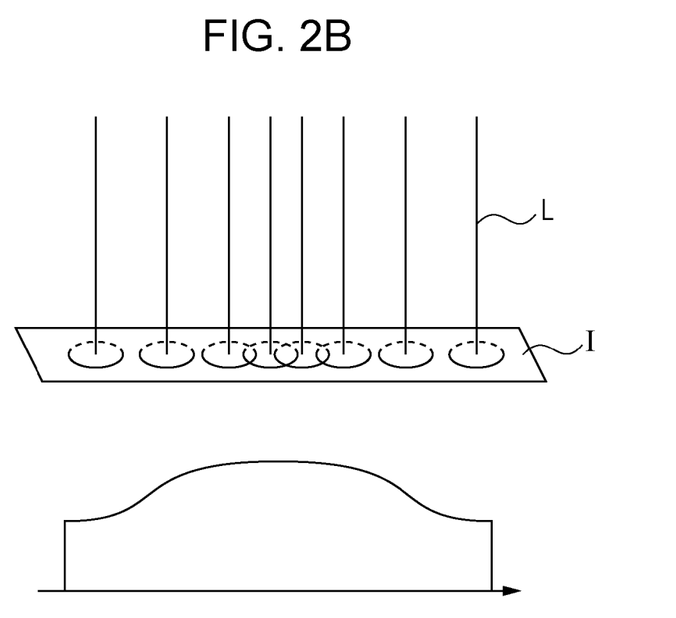

That is, the distribution of light quantity P(L1) of the beam L1 is reduced in accordance with the shapes and materials of the optical systems, and changes in accordance with P(D), i.e., the residual component. The occurrence of P(D) due to distortion will now be described with reference to FIGS. 2A and 2B. FIGS. 2A and 2B schematically show that the distribution of light quantity changes because of distortion.

FIG. 2A includes a perspective view showing a case where an optical system has no distortion and a chart showing the distribution of light quantity on an image pickup surface I in that case. In the perspective view, sub-beams L of a beam represented by straight lines have the same light quantity, and the distributions of light quantity in the cross sections of the sub-beams L are even. In the chart showing the distribution of light quantity, the vertical axis represents the light quantity, and the horizontal axis represents the in-plane position of the image pickup surface I. In the case shown in FIG. 2A, there is no deviation in coordinates due to in-plane distortion. Therefore, the sub-beams L that are evenly incident on the image pickup surface I produce an even distribution of light quantity on the image pickup surface I.

FIG. 2B includes a perspective view showing a case where the optical system has distortion and a chart showing the distribution of light quantity on the image pickup surface I in that case. In the case shown in FIG. 2B, there is a deviation in coordinates due to in-plane distortion. Therefore, the sub-beams L are dense in some areas and are sparse in other areas, producing an uneven distribution of light quantity on the image pickup surface I.

Figure 3A:
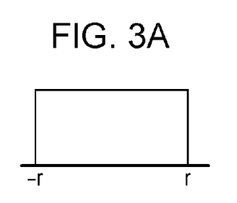
FIGS. 3A to 3F are charts showing distributions of light quantity obtained in a surface profile measuring apparatus.
Figure 3B:
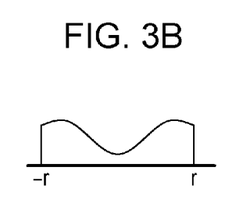

FIGS. 3A to 3F are charts showing distributions of light quantity obtained in a surface profile measuring apparatus having distortion. The charts shown in FIGS. 3A to 3F each show the distribution of light quantity obtained along the diameter of a circular beam having a radius r. FIG. 3A shows the distribution of light quantity of the beam incident on an optical system of the surface profile measuring apparatus. FIG. 3B shows the distribution of light quantity of the beam emitted from the optical system of the surface profile measuring apparatus. The distributions of light quantity shown in FIGS. 3A and 3B are different from each other, demonstrating that the distribution of light quantity is affected by the optical system.

Figure 3C:
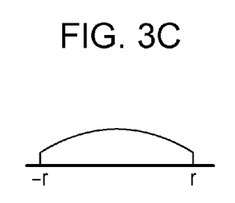
Figure 3D:
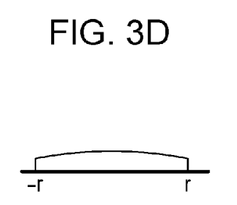

As described above, optical systems of a surface profile measuring apparatus have factors that reduce light quantity. Typical factors that reduce light quantity are the shapes and homogeneities (refractive index variation over an aperture) of optical elements included in the optical systems. The light quantity to be reduced by such factors can be found by calculation from the design values of the optical systems or by actual measurement. FIG. 3C shows the distribution of the light quantity by which the original distribution of light quantity is reduced because of the shapes of optical elements included in the optical system. FIG. 3D shows the distribution of the light quantity by which the original distribution of light quantity is reduced because of the homogeneities of the optical elements included in the optical system.

Figure 3E:
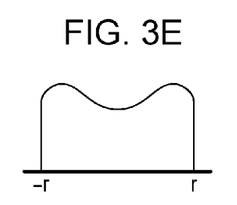
Figure 3F:
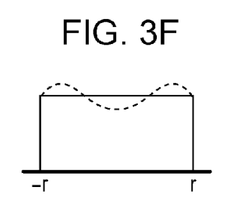

When the distributions of light quantity shown in FIGS. 3C and 3D are added to the distribution of light quantity shown in FIG. 3B, the distribution of light quantity shown in FIG. 3E is obtained. Theoretically, the distribution of light quantity shown in FIG. 3E should be the same as that shown in FIG. 3A because the factors that reduce light quantity are removed. In reality, however, since the optical system has distortions, the distributions of light quantity shown in FIGS. 3A and 3E are different from each other, as shown in FIG. 3F. In FIG. 3F, the distribution shown in FIG. 3A is represented by a solid line, and the distribution shown in FIG. 3E is represented by a broken line. Variations in light quantity represented by the broken line are because of variations in beam density such as those shown in FIG. 2B.

In FIG. 3F, areas where the broken line is above the solid line mean that the sub-beams are dense because of the distortion, and an area where the broken line is below the solid line means that the sub-beams are sparse because of the distortion. In comparing the two distributions of light quantity, the difference between the two may be calculated, or the ratio of one distribution to the other may be calculated. If the distributions are compared by the ratio, it is beneficial that noise of the beam is reduced.

Figure 4A:
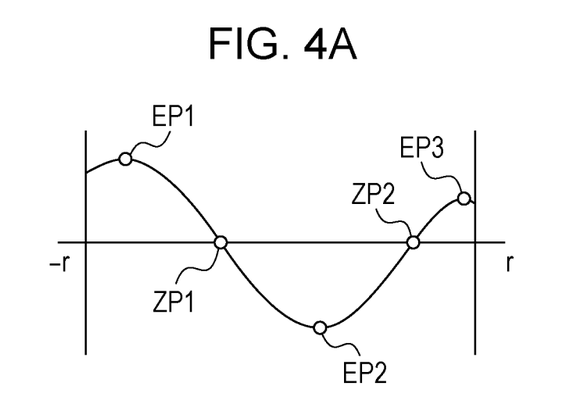
FIGS. 4A and 4B are charts showing distributions of light quantity obtained in a surface profile measuring apparatus.
Figure 4B:
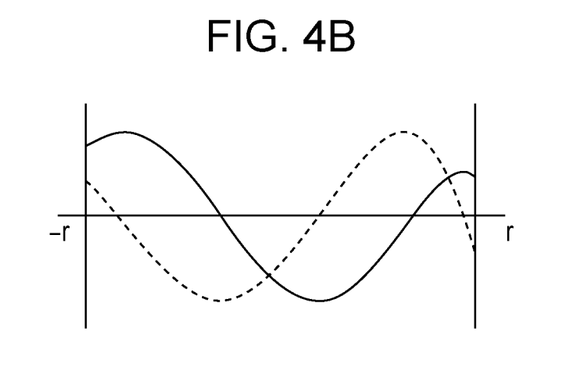

A method of calibrating the deviation in coordinates due to distortion will now be described with reference to FIGS. 4A and 4B. FIG. 4A is a chart showing the distribution of light quantity obtained along the diameter of the circular beam having the radius r and corresponds to FIG. 3F. In the distribution shown in FIG. 4A, three extreme points EP1, EP2, and EP3 are defined, including the maximum points EP1 and EP3 and the minimum point EP2. The maximum points EP1 and EP3 are defined by sub-beams gathering theretoward, whereas the minimum point EP is defined by sub-beams scattering away therefrom. Hence, it is considered that there is no deviation of sub-beams due to distortion at the sets of coordinates of the extreme points EP1 to EP3. At the points other than the extreme points EP1 to EP3, deviations in coordinates due to distortion occur in directions from the minimum point EP2 toward the maximum points EP1 and EP3.

The amount of deviation in coordinates due to distortion is not determined only from the chart shown in FIG. 4A. First, the shape of the distribution of light quantity is approximated by a function f(x). Here, if the function f(x) is differentiable in a domain containing valid data, the function f(x) may be any of the following: a one-dimensional higher-order function, a Legendre polynominal, a spline function, and the like. By differentiating the approximate function f(x), a derivative f'(x) shown by the broken line in FIG. 4B is obtained. The derivative f'(x) is zero at the extreme points EP1 to EP3 in the distribution of light quantity f(x). This means that sub-beams are gathered from or scattered toward both sides with respect to the extreme points EP1 to EP3, and the amounts of deviation in coordinates at the extreme points EP1 to EP3 are therefore zero. Hence, it is understood that the value of the derivative f'(x) corresponds to the amount of deviation. In FIG. 4B, coordinates are displaced in the positive direction at the points where the derivative f'(x) is positive and in the negative direction at the points where the derivative f'(x) is negative.

Subsequently, the absolute value of the amount of deviation in coordinates due to distortion is corrected. Referring to FIG. 4A, the difference between the theoretical and actual distributions of light quantity is zero at points ZP1 and ZP2. That is, the distribution of light quantity is not affected at the points ZP1 and ZP2. This means that, although the coordinates are deviated at the points ZP1 and ZP2, sub-beams on both sides of the points ZP1 and ZP2 are neither gathered nor scattered with respect thereto. Hence, the intervals of sub-beams falling onto the pixels of the image pickup device are considered to be constant at the points ZP1 and ZP2, and the coordinates of the points ZP1 and ZP2 can be set as the reference for correction of the absolute value of the amount of deviation. Thus, the coordinates are calibrated by the amount of deviation due to distortion obtained as described above.

Figure 5:
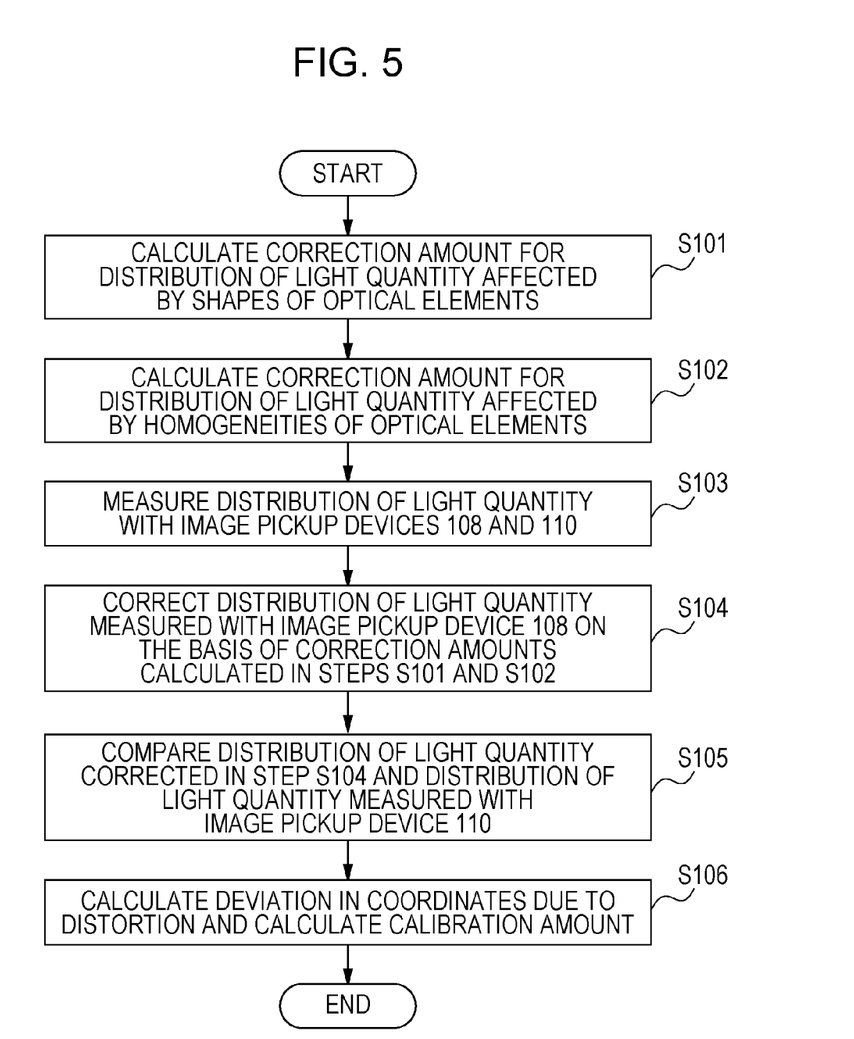
FIG. 5 is a flowchart showing a procedure of calculating the amount of calibration for the deviation in coordinates due to distortion.

Referring now to FIG. 5, a procedure of calculating the amount of calibration for the deviation in coordinates due to distortion performed in the surface profile measuring apparatus 1 will be described. FIG. 5 is a flowchart showing the procedure of calculating the amount of calibration for the deviation in coordinates due to distortion.

First, in Step S101, the amount of correction for the distribution of light quantity affected by the shapes of the optical elements included in the optical systems of the surface profile measuring apparatus 1 is calculated from the design values or measured values representing the shapes of the optical elements. Furthermore, in Step S102, the amount of correction for the distribution of light quantity affected by the homogeneities of the optical elements included in the optical systems of the surface profile measuring apparatus 1 is calculated from the measured values of the optical elements. The foregoing pieces of data are stored in a memory of the computer 109 of the surface profile measuring apparatus 1. Subsequently, in Step S103, the distribution of light quantity in the case where the measuring beam and the reference beam do not interfere with each other (or the distribution of light quantity of the reference beam alone) is measured with the image pickup device 108, and the distribution of light quantity of the beam transmitted through the beam splitter 104 is measured with the image pickup device 110. The two measurements are to be performed simultaneously. Compared to the distribution of light quantity measured with the image pickup device 110, the distribution of light quantity measured with the image pickup device 108 is affected by the optical systems (the Fizeau lens 105, the afocal lens 107, and so forth) included in the surface profile measuring apparatus 1, as described above. Therefore, in Step S104, the distribution of light quantity measured with the image pickup device 108 is corrected on the basis of the amounts of correction for the distributions of light quantity affected by the shapes and homogeneities that have been stored in the memory. Subsequently, in Step S105, the corrected distribution of light quantity and the distribution of light quantity measured with the image pickup device 110 are compared. Furthermore, in Step S106, the amount of deviation in coordinates due to distortion is calculated, as described above, in accordance with the light quantity. Here, the amount of deviation in coordinates due to distortion is calculated on the entirety of the measured area, whereby the amount of calibration for the deviation in coordinates due to distortion is determined. The amount of calibration thus determined is also stored in the memory, and is utilized for correction of data on the interference pattern obtained by the image pickup device 108. Thus, the profile of the target surface 106a is calculated precisely. In the first embodiment, the distribution of light quantity is corrected on the basis of the shapes and homogeneities of the optical elements. The correction may not necessarily be performed in such a manner. If the errors in the shapes of the optical elements are small, the correction of the distribution of light quantity on the basis of the shapes of the optical elements may not be performed. If the homogeneities of the optical elements are guaranteed to be sufficient, the correction of the distribution of light quantity on the basis of the homogeneities of the optical elements may not be performed.

Thus, with the surface profile measuring apparatus 1 according to the first embodiment, distortion is calculated precisely and easily, and the profile of the target surface 106a is calculated precisely.

Figure 10A:
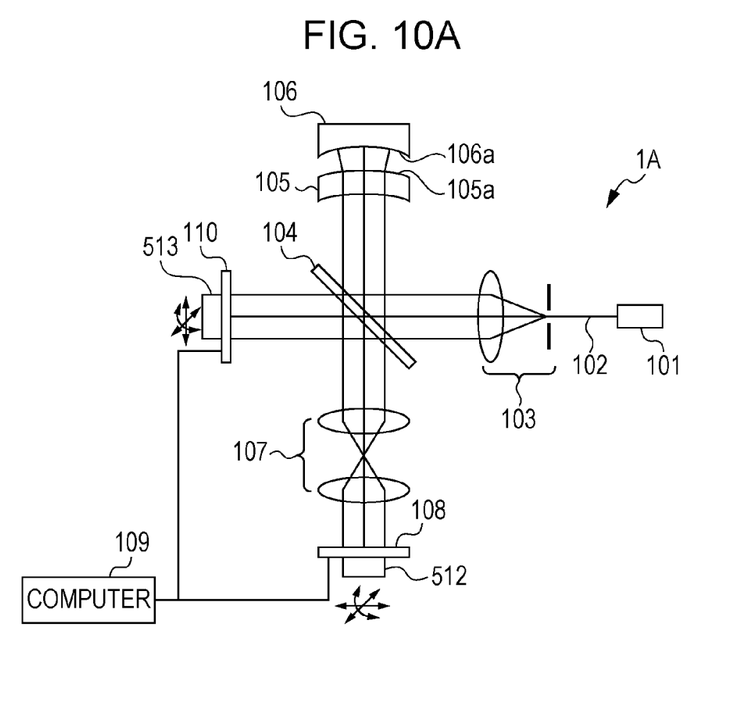
FIGS. 10A and 10B show methods of correcting the distortions of image pickup devices.
Figure 10B:
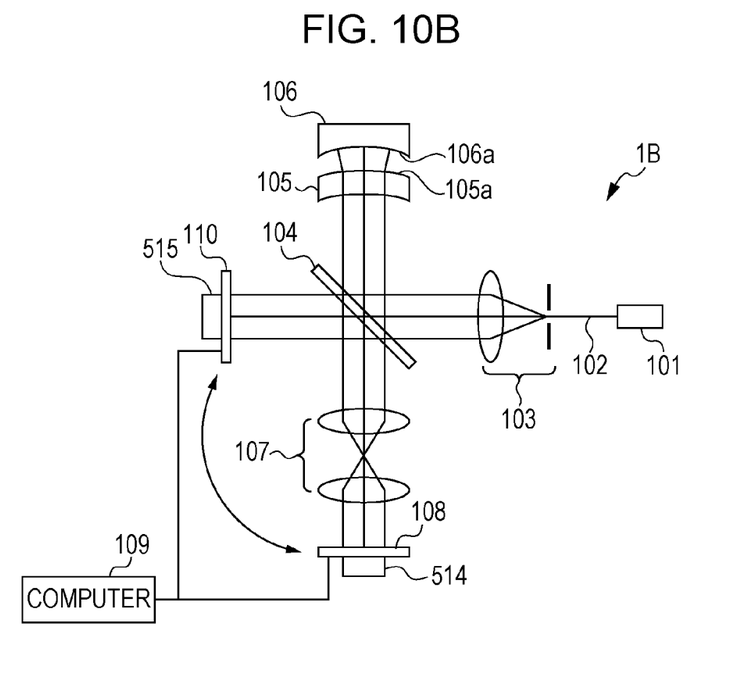

Referring now to FIGS. 10A and 10B, methods of correcting the distortions of the image pickup devices 108 and 110 of the surface profile measuring apparatus 1 according to the first embodiment will be described. FIGS. 10A and 10B each show a method of correcting the distortions of the image pickup devices 108 and 110. The image pickup devices 108 and 110 are, for example, planar array sensors in which charge-coupled devices (CCD), complementary metal-oxide semiconductors (CMOS), or the like are provided on a silicon substrate. If the silicon substrate of such a sensor bends, however, the planar array sensor may be distorted three dimensionally, and some pixels thereof may be deviated from the original plane. If such a situation occurs, an image pickup device including the sensor has distortion. Consequently, an image picked up by the image pickup device is distorted. On the other hand, if the sensitivities of the pixels on the silicon substrate are not uniform, the measured distribution of light quantity may differ from the distribution of light quantity of the beam that is actually incident on the image pickup device. If such a situation occurs, distortion may be corrected on the basis of a wrong distribution of light quantity, leading to inappropriate correction of the distortion.

In a surface profile measuring apparatus 1A shown in FIG. 10A, the image pickup device 108 is held by a drive unit 512, and the image pickup device 110 is held by a drive unit 513. The image pickup device 108 is moved by the drive unit 512 translationally in a direction perpendicular to the direction of incidence of the beam and rotationally with respect to a plane perpendicular to the direction of incidence of the beam. In such a configuration, if the image pickup device has no distortion, the result of measurement obtained with the image pickup device does not change with the moving of the image pickup device by the drive unit. In contrast, if the image pickup device has distortion, the result of measurement obtained with the image pickup device changes with the moving of the image pickup device by the drive unit. Therefore, the distortion of the image pickup device can be corrected on the basis of changes in the result of measurement (the distribution of light quantity) occurring with the moving of the image pickup device by the drive unit.

When the image pickup device 108 is translationally moved in the direction perpendicular to the direction of incidence of the beam by a length that is an even-number multiple of the pixel pitch, sub-beams that have been incident on one of the pixels are all incident on another pixel. Thus, the distortion of the image pickup device 108 can be detected regardless of the areas and arrangement of the pixels, and the distortion of the image pickup device 108 can be calculated easily. Such a translational movement of the image pickup device 108 alone does not provide sufficient sensitivity for the distortion due to linear deviation of pixels. Therefore, the image pickup device 108 is also moved rotationally. Thus, the distortion occurring linearly can be also measured.

The image pickup device 110 is moved by the drive unit 513 as the image pickup device 108 is moved. By moving the image pickup device 110 with the drive unit 513, the distortion of the image pickup device 110 can be measured. The drive units 512 and 513 are, for example, piezoelectric devices or direct-drive motors.

In a surface profile measuring apparatus 1B shown in FIG. 10B, the image pickup device 108 is held by a holding unit 514, and the image pickup device 110 is held by a holding unit 515. The holding units 514 and 515 include identical holding mechanisms. Therefore, image pickup devices to be held by the holding units 514 and 515 are exchangeable, that is, the image pickup devices 108 and 110 are exchangeable. If the image pickup devices 108 and 110 are exchanged in a case where the image pickup devices 108 and 110 have different distortions, the distortion due to the image pickup devices 108 and 110 and the distortion due to the optical systems can be separated because the image pickup devices 108 and 110 have different distributions of light quantity.

Second Embodiment

Figure 6:
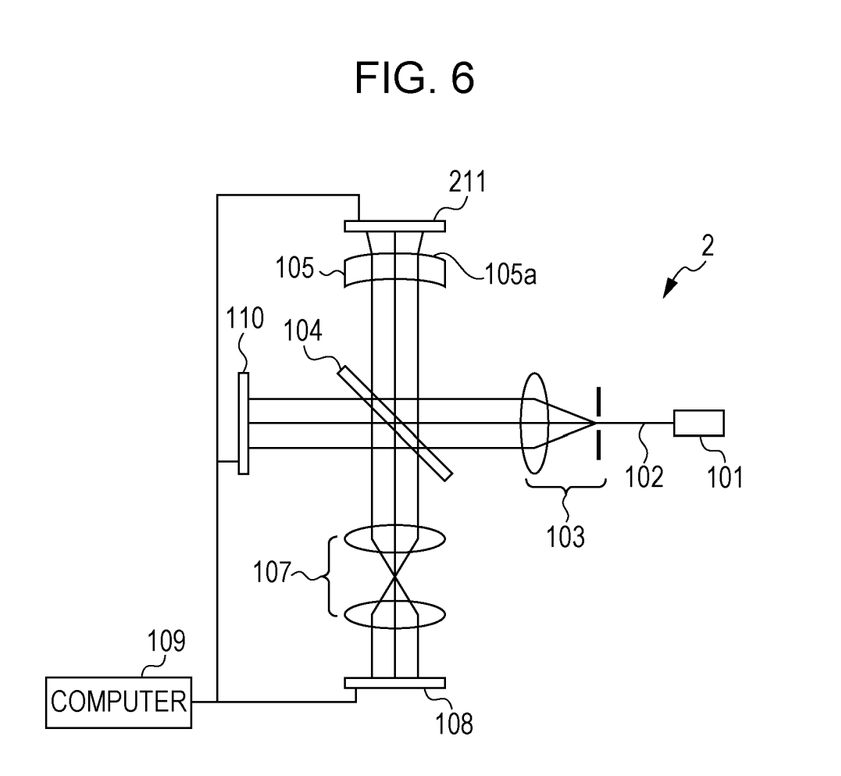
FIG. 6 shows the configuration of a surface profile measuring apparatus according to a second embodiment of the present invention.

A surface profile measuring apparatus 2 according to a second embodiment of the present invention will now be described with reference to FIG. 6. FIG. 6 shows the configuration of the surface profile measuring apparatus 2 according to the second embodiment. In the surface profile measuring apparatus 2, a third image pickup device 211 is provided at a position facing the Fizeau lens 105 and in such a manner as to be exchangeable with the object 106. The image pickup device 211 is used for measurement of the distribution of light quantity of the beam transmitted through the Fizeau lens 105. With such a configuration, the surface profile measuring apparatus 2 according to the second embodiment can measure and correct the distortion of the Fizeau lens 105.

Figure 7A:
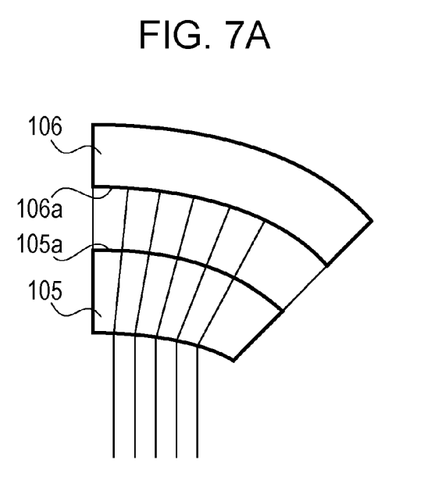
FIGS. 7A and 7B each show the behavior of sub-beams around a Fizeau lens.

The necessity of measuring the distortion of the Fizeau lens 105 will now be described with reference to FIGS. 7A and 7B. FIG. 7A shows the behavior of sub-beams included in a beam around the Fizeau lens 105 in a case where the Fizeau lens 105 is an ideal optical system having no distortion. A beam including sub-beams producing an even distribution of light quantity enters the Fizeau lens 105. If the Fizeau lens 105 has no distortion, the reference beam reflected by the Fizeau surface 105a and the measuring beam reflected by the target surface 106a interfere with each other without deviation in coordinates thereof. Such a situation can be expressed as that the retracement is successful, because the measuring beam returns along the path along which the reference beam returns.

Figure 7B:
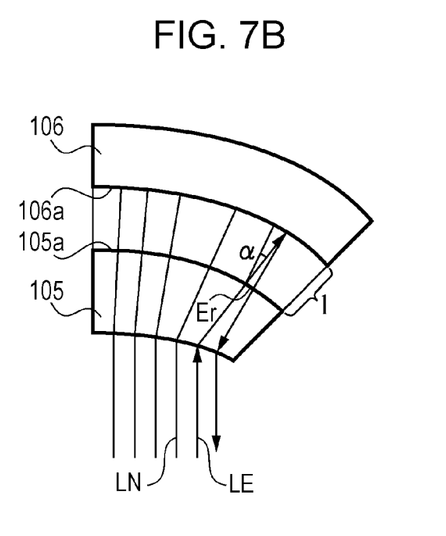

FIG. 7B shows the behavior of sub-beams included in a beam around the Fizeau lens 105 in a case where the Fizeau lens 105 has distortion. A sub-beam LE shown in FIG. 7B is incident at a deviated position on the target surface 106a because of the distortion of the Fizeau lens 105. If the gap between the Fizeau surface 105a and the target surface 106a is large, the sub-beam LE does not return to the position on the Fizeau surface 105a from which the sub-beam LE has been emitted. Such an in-plane error Er is referred to as a retracement error. The retracement error Er is expressed as follows:

$$Er = 2 \cdot l \cdot \tan \alpha \quad (4)$$

where $\alpha$ denotes the inclination of the sub-beam LE with respect to the normal to the Fizeau surface 105a, l denotes the gap between the Fizeau surface 105a and the target surface 106a. According to Expression (4), the retracement error Er increases with the increase in the gap l. A retracement error Er that is smaller than or equal to half a single pixel when converted into an error on the image pickup device 108 is tolerable. If the retracement error Er exceeds such a tolerance, the interference pattern and the distribution of light quantity (the distribution of light quantity in the case where the measuring beam and the reference beam do not interfere with each other or the distribution of light quantity of the reference beam alone) obtained by the image pickup device 108 are distorted.

In contrast, if the gap l is small, the retracement error Er is negligibly small. For example, referring to FIG. 7B, a sub-beam LN is incident at a deviated position on the target surface 106a because of the distortion of the Fizeau lens 105, and is reflected at the deviated position. However, if the gap l is small, the sub-beam LN reflected by the target surface 106a returns along the path along which the sub-beam LN has been incident. In such a case, although the data on the interference pattern obtained by the image pickup device 108 includes distortion because the measured position on the target surface 106a is deviated, the distribution of light quantity obtained by the image pickup device 108 is not affected. Therefore, to measure the distortion of the Fizeau lens 105, the light quantity of a beam that has been transmitted through the Fizeau lens 105 only once is to be measured.

Figure 8:
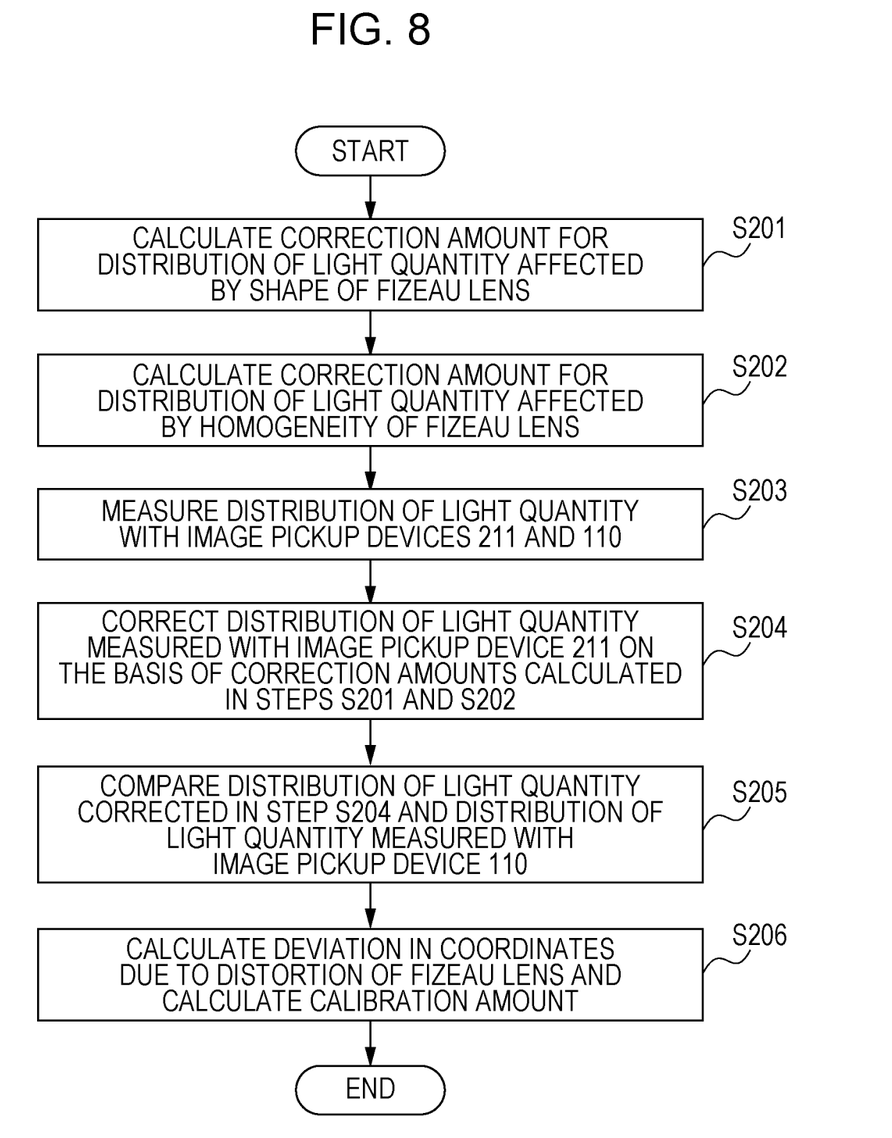
FIG. 8 is a flowchart showing a procedure of calculating the distortion of the Fizeau lens.

Referring now to FIG. 8, a procedure of calculating the distortion of the Fizeau lens 105 included in the surface profile measuring apparatus 2 will be described. FIG. 8 is a flowchart showing the procedure of calculating the distortion of the Fizeau lens 105.

First, in Step S201, the amount of correction for the distribution of light quantity affected by the shape of the Fizeau lens 105 is calculated from the design values or measured values. Furthermore, in Step S202, the amount of correction for the distribution of light quantity affected by the homogeneity of the Fizeau lens 105 is calculated from the measured values. The foregoing pieces of data are stored in the memory of the computer 109 of the surface profile measuring apparatus 2. Subsequently, in Step S5203, the distribution of light quantity of the beam reflected by the beam splitter 104 and transmitted through the Fizeau lens 105 is measured with the image pickup device 211, and the distribution of light quantity of the beam transmitted through the beam splitter 104 is measured with the image pickup device 110. The two measurements are to be performed simultaneously. In Step S204, the distribution of light quantity measured with the image pickup device 211 is corrected on the basis of the amounts of correction for the distributions of light quantity affected by the shape and homogeneity of the Fizeau lens 105 that are stored in the memory. Subsequently, in Step S205, the corrected distribution of light quantity and the distribution of light quantity measured with the image pickup device 110 are compared. Furthermore, in Step S206, the amount of deviation in coordinates due to the distortion of the Fizeau lens 105 is calculated, likewise in the first embodiment, in accordance with the light quantity. The result of the calculation is also stored in the memory and is utilized for correction of data on the interference pattern obtained by the image pickup device 108. Thus, the profile of the target surface 106a is calculated precisely. In the second embodiment, the distribution of light quantity is also corrected on the basis of the shape and homogeneity of the Fizeau lens 105. The correction may not necessarily be performed in such a manner.

Thus, with the surface profile measuring apparatus 2 according to the second embodiment, the distortion of the Fizeau lens 105 is calculated precisely and easily, and the profile of the target surface 106a is calculated precisely.

The methods of calculating the amount of calibration according to the first and second embodiments may be practiced individually or in combination. If the two method are practiced in combination, the profile of the target surface 106a is calculated more precisely.

Third Embodiment

Figure 9:
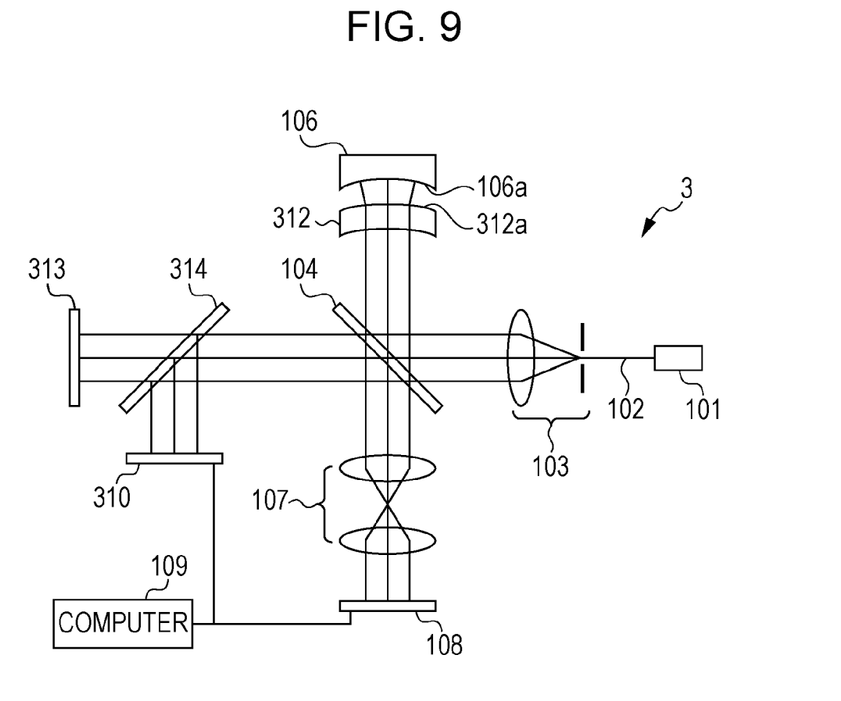
FIG. 9 shows the configuration of a surface profile measuring apparatus according to a third embodiment of the present invention.

A surface profile measuring apparatus 3 according to a third embodiment of the present invention will now be described with reference to FIG. 9. FIG. 9 shows the configuration of the surface profile measuring apparatus 3 according to the third embodiment. The surface profile measuring apparatus 3 is a Twyman-Green interferometer.

In the surface profile measuring apparatus 3, the beam emitted from the light source 101 and reflected by the beam splitter 104 (a first beam splitter) is incident on the object 106 through a wavefront conversion element 312. The beam reflected by the object 106 is transmitted through the wavefront conversion element 312 and the beam splitter 104, and is incident, as the measuring beam, on the image pickup device 108 through the afocal lens 107. Meanwhile, the beam emitted from the light source 101 and transmitted through the beam splitter 104 is reflected by a reference mirror 313 and by the beam splitter 104, and is incident, as the reference beam, on the image pickup device 108 through the afocal lens 107. A beam splitter 314 (a second beam splitter) is provided in a path extending between the beam splitter 104 and the reference mirror 313. The beam splitter 314 reflects a portion of the beam transmitted through the beam splitter 104 and traveling toward the reference mirror 313 and guides the portion of the beam to a second image pickup device 310.

A wavefront conversion element is an optical element that converts the wavefront of a beam incident thereon in such a manner as to cause the beam emitted therefrom to be perpendicularly incident on a target surface. The wavefront conversion element is also called a null lens. Exemplary wavefront conversion elements include a lens and a diffractive optical element. The wavefront conversion element 312 converts the beam from the beam splitter 104 into a beam that is perpendicularly incident on the target surface 106a.

The measuring beam and the reference beam that are incident on the image pickup device 108 interfere with each other, thereby forming an interference pattern on the image pickup device 108. The image pickup device 108 picks up the image of the interference pattern. The image pickup device 310 measures (picks up the image of) the distribution of light quantity of the beam reflected by the beam splitter 314. Likewise in the first embodiment, the profile of the target surface 106a is calculated precisely from the distribution of light quantity measured with the image pickup device 108 and the distribution of light quantity measured with the image pickup device 310. Likewise in the second embodiment, the surface profile measuring apparatus 3 according to the third embodiment may include the third image pickup device 211 at a position facing the wavefront conversion element 312 in such a manner as to be exchangeable with the object 106.

Fourth Embodiment

Figure 11:
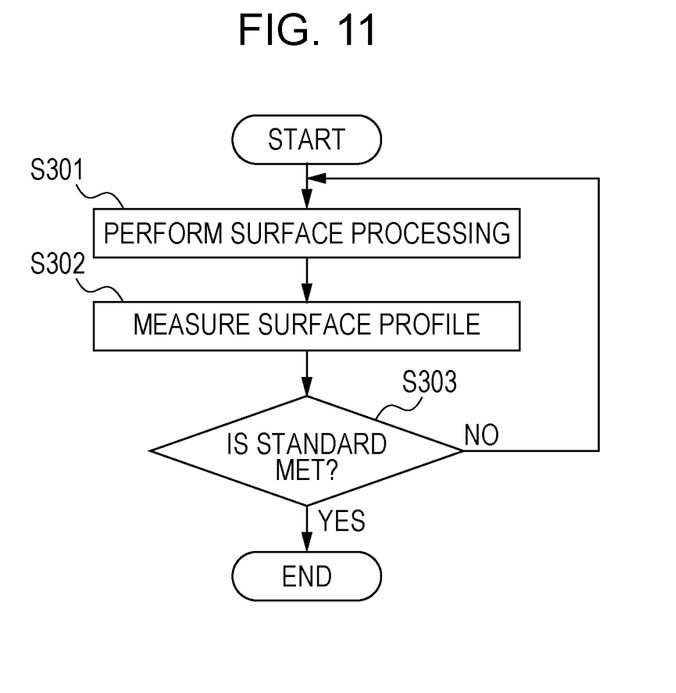
FIG. 11 is a flowchart showing a method of manufacturing an optical element.

A method of manufacturing an optical element with any of the surface profile measuring apparatuses 1 to 3 described above will now be described. FIG. 11 is a flowchart showing the method of manufacturing an optical element. First, in Step S301, a surface of an optical element is processed into a specific shape. Subsequently, in Step S302, the profile of the processed surface of the optical element is measured with any of the surface profile measuring apparatuses 1 to 3 described above. In Step S303, whether or not the profile of the processed surface of the optical element meets a desired standard is determined on the basis of the result of the measurement. If the standard is not met, the surface of the optical element is processed again, and the profile of the processed surface is measured. The processing and the measurement are repeated until the standard is met. By the method of manufacturing an optical element according to the fourth embodiment, the deviation between the measuring coordinates and the processing coordinates is reduced. Consequently, an optical element is manufactured more efficiently at a higher yield rate than in related-art methods.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-285770 filed Dec. 16, 2009, which is hereby incorporated by reference herein in its entirety.

What is claimed is:

1. A surface profile measuring apparatus in which a profile of a target surface is measured on the basis of an interference pattern formed by interference between a measuring beam reflected by the target surface and a reference beam, the apparatus comprising:
   a first image pickup device configured to pick up an image of the interference pattern;
   an optical system configured to guide the measuring beam and the reference beam to the first image pickup device;
   a second image pickup device with which a distribution of light quantity of a beam of the light from the light source traveling thereto avoiding the optical system is measured; and
   an arithmetic unit configured to calculate a profile of the target surface on the basis of the image of the interference pattern picked up by the first image pickup device,
   wherein a distribution of light quantity of a beam of the light from the light source transmitted through the optical system is measured with the first image pickup device, and
   wherein the arithmetic unit is configured to obtain the profile of the target surface by calculating distortion of the optical system on the basis of the distribution of light quantity measured with the first image pickup device and the distribution of light quantity measured with the second image pickup device, and correcting, on the basis of the distortion, the profile of the target surface calculated on the basis of the interference pattern.

2. The surface profile measuring apparatus according to claim 1, further comprising:
   a beam splitter configured to split the light from the light source into two beams; and
   a Fizeau lens having a Fizeau surface that splits one of the two beams into the measuring beam and the reference beam,
   wherein a distribution of light quantity of the reference beam reflected by the Fizeau surface and transmitted through the optical system is measured with the first image pickup device, wherein a distribution of light quantity of the other of the two beams is measured with the second image pickup device, and wherein the profile of the target surface calculated by the arithmetic unit is corrected on the basis of the distribution of light quantity of the reference beam measured with the first image pickup device and the distribution of light quantity of the other beam measured with the second image pickup device.

3. The surface profile measuring apparatus according to claim 2, further comprising:

a third image pickup device with which a distribution of light quantity of the measuring beam transmitted through the Fizeau surface is measured, wherein the profile of the target surface calculated by the arithmetic unit is corrected on the basis of the distribution of light quantity of the measuring beam measured with the third image pickup device and the distribution of light quantity of the other beam measured with the second image pickup device.

4. The surface profile measuring apparatus according to claim 2, wherein the distribution of light quantity measured with the first image pickup device is corrected on the basis of at least one of a shape and a homogeneity of the Fizeau lens.

5. The surface profile measuring apparatus according to claim 1, further comprising:

a first beam splitter configured to split the light from the light source into the measuring beam and the reference beam;

a reference mirror reflecting the reference beam from the first beam splitter; and a second beam splitter provided in an optical path extending between the first beam splitter and the reference mirror and configured to split the reference beam into two beams, wherein a distribution of light quantity of the measuring beam reflected by the target surface and transmitted through the optical system is measured with the first image pickup device, wherein a distribution of light quantity of one of the two beams is measured with the second image pickup device, and wherein the profile of the target surface calculated by the arithmetic unit is corrected on the basis of the distribution of light quantity of the measuring beam measured with the first image pickup device and the distribution of light quantity of the one beam measured with the second image pickup device.

6. The surface profile measuring apparatus according to claim 5, further comprising:

a wavefront conversion element configured to convert a wavefront of the measuring beam from the first beam splitter and to guide the measuring beam to the target surface; and a third image pickup device with which a distribution of light quantity of the measuring beam transmitted through the wavefront conversion element is measured, wherein the profile of the target surface calculated by the arithmetic unit is corrected on the basis of the distribution of light quantity of the measuring beam measured with the third image pickup device and the distribution of light quantity of the one beam measured with the second image pickup device.

7. The surface profile measuring apparatus according to claim 6, wherein the distribution of light quantity measured with the first or third image pickup device is corrected on the basis of at least one of a shape and a homogeneity of the wavefront conversion element.

8. The surface profile measuring apparatus according to claim 1, wherein the distribution of light quantity measured with the first image pickup device is corrected on the basis of at least one of a shape and a homogeneity of an optical element included in the optical system.

9. The surface profile measuring apparatus according to claim 1, further comprising a drive unit configured to move the first or second image pickup device, wherein the drive unit moves the first or second image pickup device in at least one of a rotational manner and a translational manner.

10. A method of measuring a surface profile in which light from a light source is split into a measuring beam and a reference beam and a profile of a target surface is measured on the basis of an interference pattern formed by interference between the measuring beam reflected by the target surface and the reference beam, the method comprising:

picking up an image of the interference pattern with a first image pickup device;

guiding, with an optical system, the measuring beam and the reference beam to the first image pickup device;

measuring, with a second image pickup device, a distribution of light quantity of a beam of the light from the light source traveling in such a manner as to avoid the optical system;

calculating, with an arithmetic unit, the profile of the target surface on the basis of the image of the interference pattern picked up with the first image pickup device;

measuring, with the first image pickup device, a distribution of light quantity of a beam of the light from the light source transmitted through the optical system; and correcting the profile of the target surface calculated with the arithmetic unit on the basis of the distribution of light quantity measured with the first image pickup device and the distribution of light quantity measured with the second image pickup device.

11. The method of measuring a surface profile according to claim 10, further comprising exchanging the first image pickup device and the second image pickup device.

12. A method of manufacturing an optical element, comprising:

measuring a profile of a surface of an optical element by the method of measuring a surface profile according to claim 10; and processing the surface of the optical element on the basis of a result of the measurement.

* * * * *